US012783446B2

(12) United States Patent
Dejanovic et al.

(10) Patent No.: US 12,783,446 B2
(45) Date of Patent: Nov. 3, 2026

(54) NETWORK DEVICES WITH MULTI-INTERFACE BRIDGE AND COUNT AGGREGATION AND PUBLISHING CIRCUITRY

(71) Applicant: Arista Networks, Inc., Santa Clara, CA (US)

(72) Inventors: Thomas Dejanovic, Sydney (AU); Wei Leong Soon, Sydney (AU); Utshash Das, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 826 days.

(21) Appl. No.: 18/078,798

(22) Filed: Dec. 9, 2022

(65) Prior Publication Data

US 2024/0193118 A1 Jun. 13, 2024

(51) Int. Cl.
*G06F 13/20* (2006.01)
*G06F 13/40* (2006.01)
*G06F 13/42* (2006.01)

(52) U.S. Cl.
CPC ...... *G06F 13/4282* (2013.01); *G06F 13/4027* (2013.01); *G06F 13/4247* (2013.01)

(58) Field of Classification Search
None
See application file for complete search history.

(56) References Cited

U.S. PATENT DOCUMENTS 6,006,275 A 12/1999 Picazo, Jr. et al.
6,381,642 B1 * 4/2002 O'Donnell .............. H04L 43/00 709/224
6,611,866 B1 8/2003 Goldman
6,721,334 B1 4/2004 Ketcham
2005/0015388 A1 1/2005 Dasgupta et al.
2009/0067441 A1 3/2009 Ansari et al.
2014/0040367 A1 2/2014 Lessin et al.
2015/0207719 A1 * 7/2015 Chakhaiyar ........... H04L 49/602 370/252
2017/0091114 A1 * 3/2017 Gold ................... G06F 11/1072
2019/0260676 A1 * 8/2019 Singh ....................... H04L 45/38
2020/0409567 A1 * 12/2020 Bueb ..................... G06F 3/0683
2022/0012196 A1 * 1/2022 Lee ...................... G11C 7/1063
2022/0311715 A1 * 9/2022 Schubert ................. H04L 45/24

* cited by examiner

*Primary Examiner* — Henry Tsai
*Assistant Examiner* — Dean Phan
(74) *Attorney, Agent, or Firm* — Treyz Law Group; Jason Tsai

(57) ABSTRACT

A network device can include a main processor and a packet processor. The packet processor can include multiple physical interfaces operable to communicate with external processors using different communications protocols, data storage elements, and a multi-interface bridge that enables the external processors to access the data storage elements using a common address map. The packet processor can include multiple input-output ports, host interface counter circuitry coupled to an external processor via one or more register interfaces, and client interface counter circuitry configured to accumulate count values for at least some of the input-output ports and to write the accumulated count values into memory on the host interface counter circuitry. The accumulated count values can be published by the host interface counter circuitry to a local or remote server via a statistics publishing interface.

20 Claims, 7 Drawing Sheets

NETWORK DEVICES WITH MULTI-INTERFACE BRIDGE AND COUNT AGGREGATION AND PUBLISHING CIRCUITRY

BACKGROUND

A network switch can include a central processing unit (CPU) coupled to a packet processor. The packet processor can be implemented as an application specific integrated circuit (ASIC) or a field programmable gate array (FPGA). The packet processor can be used to maintain a large number of count values and other state or status information that are periodically read out by software on the CPU to populate a central database or to perform other network operations. Using software on the CPU to actively read values out from the packet processor can consume a substantial amount of CPU time and interface bandwidth.

It can be challenging to design a network device with different software and hardware development cycles. Because the address map of counter values and other state variables need to be properly synchronized between the CPU and the packet processor, the software and hardware development cycles have to be kept in sync, placing added pressure on the teams designing the software on the CPU and the packet processing hardware. It is within this context that the embodiments herein arise.

DETAILED DESCRIPTION

A network device such as a router or switch may include a main processor (CPU) and an associated packet processor for processing data packets in accordance with a network protocol. The packet processor can be implemented as an application-specific integrated circuit (ASIC) or a field-programmable gate array (FPGA) device. The packet processor can include a multi-interface bridge for connecting a group or tree of registers to a plurality of physical interfaces configured to support different communications protocols. The various physical interfaces can access the tree of registers using a universal address map that is shared among the plurality of interfaces. Use of a multi-interface bridge to support a plurality of physical interfaces enables the development of new hardware features while supporting new and old interfaces so that the new hardware is backwards compatible with existing software. The multi-interface bridge can thus help decouple the software development cycle from the hardware development cycle.

The packet processor can also include count aggregation circuitry configured to efficiently collect counter (count) values for each physical interface (also referred to as a port), to group the counter values of each port into a data packet, and to transmit or publish the data packet over the network. The count aggregation circuitry can include host interface counter circuitry and client interface counter circuitry. The client interface counter circuitry may be coupled to a plurality of ports. The client interface counter circuitry may include a plurality of partial sum circuits each of which is configured to obtain count values associated with a respective one of the ports, a plurality of sum select circuits configured to select a partial sum value to be output for accumulation, and a global accumulation circuit configured to receive selected partial sum values from the plurality of sum select circuits.

The count values stored in the global accumulation circuit can be duplicated to a memory in the host interface counter circuitry. The host interface counter circuitry can read count values associated with a particular port from the memory, package the count values into a data packet, and publish the data packet via a statistics publishing interface. Data packets generated in this way can be gathered and stored at a local server or a remote (central) database. Gathering count/statistics information in this way alleviates the need for software running on the main processor to actively read or poll all of the registers, counters, or other storage circuits from the packet processor.

Figure 1:
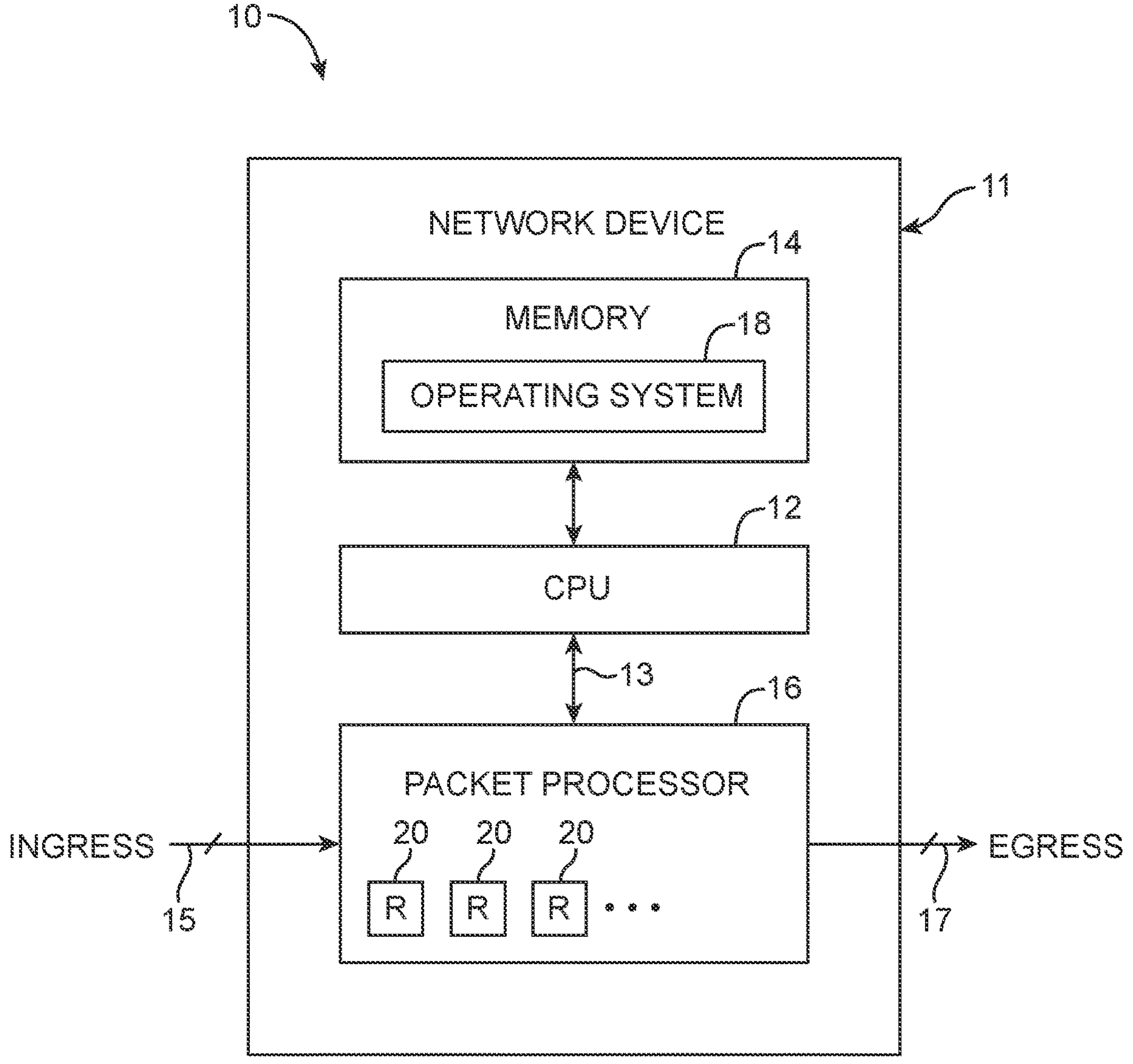
FIG. 1 is a diagram of an illustrative network device configured to route data packets in accordance with some embodiments.

FIG. 1 is a diagram of a network device such as network device 10 that can be used to store a table of values. Network device 10 may be a router, a switch, a bridge, a hub, a repeater, a firewall, a device serving other networking functions, a device that includes a combination of these functions, or other types of network elements. As shown in FIG. 1, network device 10 may include processing circuitry such as a central processing unit (CPU) 12, storage circuitry including memory 14, and a packet processing circuit such as packet processor 16 all disposed within a housing 11 of device 10. Housing 11 may be an exterior cover (e.g., a plastic exterior shell, a metal exterior shell, or an exterior shell formed from other rigid or semirigid materials) that provides structural support and protection for the components mounted within the housing. In general, processing unit 12 may represent processing circuitry based on one or more microprocessors, graphics processing units (GPUs), host processors, general-purpose processors, microcontrollers, digital signal processors, application-specific integrated circuits (ASICs), application-specific system processors (ASSPs), programmable logic devices such as field-programmable gate arrays (FPGAs), a combination of these processors, or other types of processors. Central processing unit 12 may sometimes be referred to herein as a main processor 12.

Processor 12 may be used to run a network device operating system such as operating system (OS) 18 and/or other software/firmware that is stored on memory 14. Memory 14 may include non-transitory (tangible) computer readable storage media that stores operating system 18 and/or any software code, sometimes referred to as program instructions, software, data, instructions, or code. Memory 14 may include nonvolatile memory (e.g., flash memory or other electrically-programmable read-only memory configured to form a solid-state drive), volatile memory (e.g., static or dynamic random-access memory), hard disk drive storage, and/or other storage circuitry. The processing circuitry and storage circuitry described above are sometimes referred to collectively as control circuitry. Processor 12 and memory 14 are sometimes referred to as being part of a control plane of network device 10.

Operating system 18 in the control plane of network device 10 may exchange network topology information with other network devices using a routing protocol. Routing protocols are software mechanisms by which multiple network devices communicate and share information about the topology of the network and the capabilities of each network device. For example, network routing protocols may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Immediate system-to-immediate system (IS-IS) protocol, or other Internet routing protocols (just to name a few).

Packet processor 16 is oftentimes referred to as being part of a data plane or forwarding plane. Packet processor 16 may represent processing circuitry based on one or more microprocessors, general-purpose processors, application specific integrated circuits (ASICs), programmable logic devices such as field-programmable gate arrays (FPGAs), a combination of these processors, or other types of processors. Packet processor 16 receives incoming data packets via an ingress port 15, analyzes the received data packets, processes the data packets in accordance with a network protocol, and forwards (or drops) the data packet accordingly.

A data packet is a formatted unit of data conveyed over the network. Data packets conveyed over a network are sometimes referred to as network packets. A group of data packets intended for the same destination should have the same forwarding treatment. A data packet typically includes control information and user data (payload). The control information in a data packet can include information about the packet itself (e.g., the length of the packet and packet identifier number) and address information such as a source address and a destination address. The source address represents an Internet Protocol (IP) address that uniquely identifies the source device in the network from which a particular data packet originated. The destination address represents an IP address that uniquely identifies the destination device in the network at which a particular data packet is intended to arrive.

Data packets received in the data plane may optionally be analyzed in the control plane to handle more complex signaling protocols. Packet processor 16 may generally be configured to partition data packets received at ingress port 15 into groups of packets based on their destination address and to choose a next hop device for each data packet when exiting an egress port 17. The choice of next hop device for each data packet may occur through a hashing process (as an example) over the packet header fields, the result of which is used to select from among a list of next hop devices in a routing table stored on memory in packet processor 16. Such routing table listing the next hop devices for different data packets is sometimes referred to as a hardware forwarding table, a hardware forwarding information base (FIB), or a media access control (MAC) address table. The routing table may list actual next hop network devices that are currently programmed on network device 10 for each group of data packets having the same destination address. If desired, the routing table may also list actual next hop devices currently programmed for device 10 for multiple destination addresses (i.e., device 10 can store a single hardware forwarding table separately listing programmed next hop devices corresponding to different destination addresses). The example of FIG. 1 showing an ingress port 15 for receiving incoming data packets and an egress port 17 for outputting outgoing data packets is merely illustrative. In general, packet processor 16 can be coupled to a plurality of ingress ports and egress ports.

Packet processor 16 may include storage components for storing count values, state information, statistics information, or other data that might be used for performing routing or networking functions. For example, packet processor 16 may include register circuits such as registers 20 for storing data within the packet processor. The use of registers 20 is merely exemplary. In general, other types of data storage elements such as counters, memory, and block random-access memory (RAMs) can be included within packet processor 16. In some embodiments, the data can also be stored on one or more external memory devices that are directly coupled to packet processor 16.

The main processor 12 may need to access the information stored on registers 20 and the other data storage components associated with packet processor 16. Processor 12 may communicate with packet processor 16 via a processor-to-processor physical interface 13. Interface 13 may represent one or more processor-to-processor physical interfaces for communicating with different processors using different types of computer bus protocols. For example, processor-to-processor interface(s) 13 can include one or more $I^2C$ (Inter-Integrated Circuit) computer interface/bus, one or more PCIe (Peripheral Component Interconnect Express) computer interface/bus, one or more Ethernet computer interface/bus, one or more UART (Universal Asynchronous Reception and Transmission) computer interface/bus, one or more SPI (Serial Peripheral Interface) computer interface/bus, one or more RapidIO computer interface/bus, one or more Interlaken computer interface/bus, one or more AGP (Accelerated Graphics Port) computer interface/bus, and/or other types of processor-to-processor interface.

Conventionally, a packet processor might include only one type of physical interface for communicating with a corresponding CPU on the same network device. In such scenarios, any hardware updates to the packet processor will also require a corresponding software update to the CPU, thus placing a tight coupling requirement between the software development cycle and the hardware development cycle.

Figure 2:
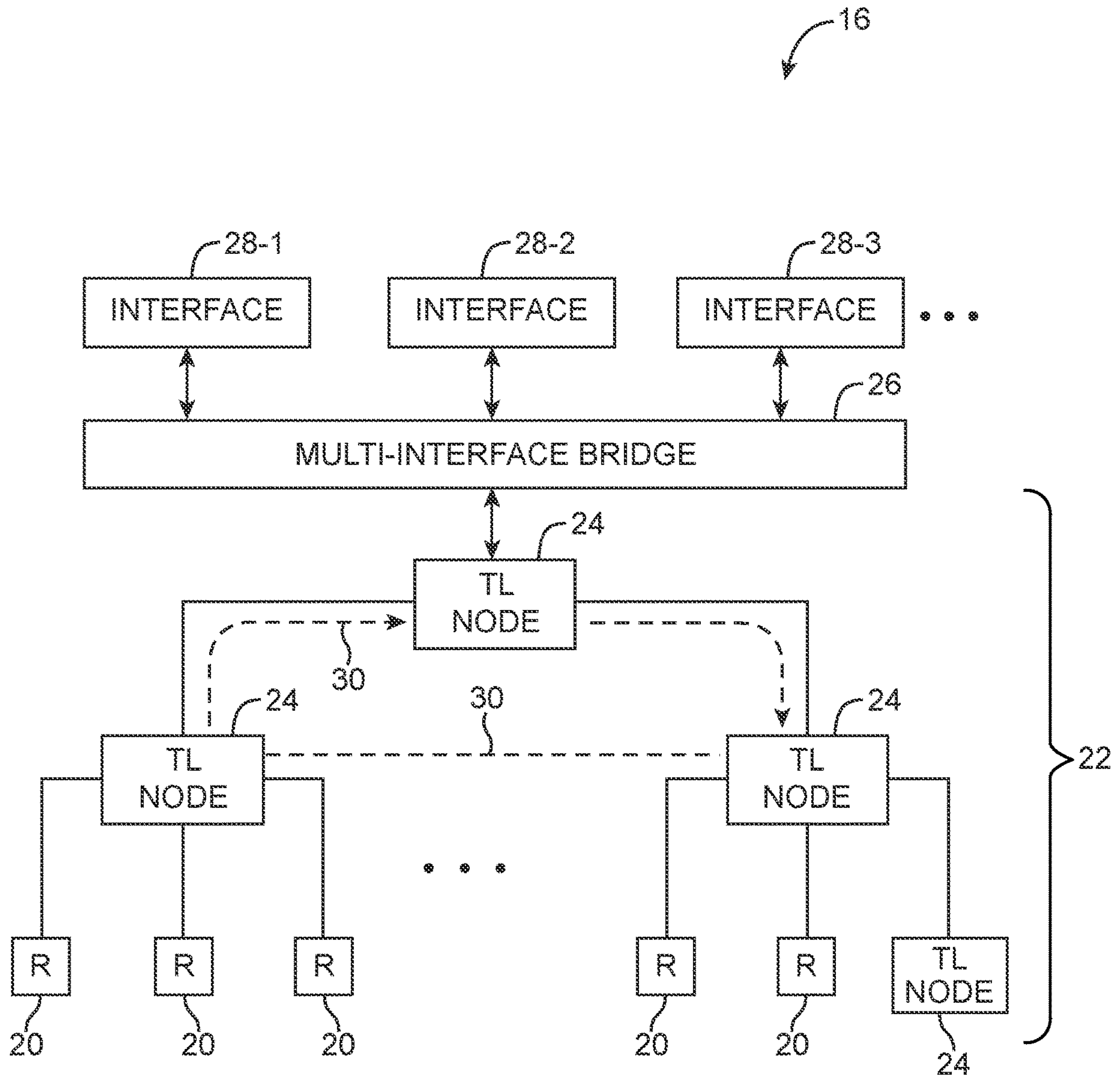
FIG. 2 is a diagram of an illustrative packet processor that includes a multi-interface bridge in accordance with some embodiments.

In accordance with an embodiment, packet processor 16 may be provided with a multi-interface bridge component operable with different types of physical interfaces. FIG. 2 is a diagram of an illustrative packet processor 16 that includes multi-interface bridge 26 interposed between multiple physical interfaces 28 and a network of storage components 22. As shown in FIG. 2, multi-interface bridge 26 can be coupled to a first physical interface 28-1, a second physical interface 28-2, and/or a third physical interface 28-3. Interfaces 28 can be different types of communications interfaces. For example, first physical interface 28-1 may be used to communicate with a first external processor using the $I^2C$ communications protocol; second physical interface 28-2 may be used to communicate with a second external processor using the PCIe communications protocol; and third physical interface 28-3 may be used to communicate with a third external processor using the Ethernet communications protocol. This is merely illustrative. Multi-interface bridge 26 can be operable with two or more different types of physical interfaces, three or more different types of physical interfaces, four or more different types of physical interfaces, 3-10 different types of physical interfaces, or more than 10 different types of physical interfaces based on different computer bus or communications protocols. Only one of the multiple interfaces 28 can be in use at any given point in time, or multiple interfaces 28 can be simultaneously active (if desired).

Network 22 may include storage components (elements) 20 coupled together using a plurality of transport layer (TL) nodes 24. As the name suggests, the "transport layer" nodes can represent or can be defined as connection nodes in layer 4 (L4) of the OSI (Open Systems Interconnection) model, which sits between the higher application layer and the lower Internet layer. The transport layer nodes 24 can be connected to form a tree-like network. If desired, some of the transport layer nodes 24 can optionally be connected in a daisy chain, as shown by dotted path 30. Storage components 20 may be connected to the "leaf" (endpoint) nodes of the tree-like network. Storage components 20 may represent registers, counters, memory, block random-access memory (RAMs), and/or other types of data storage elements for storing count values, state information, statistics information, or other information that might be used for performing routing or networking functions.

Network 22 configured in this way is therefore sometimes referred to as a transport layer routing and data storage network. The example of FIG. 2 in which transport layer routing and data storage network 22 includes three total layers in the tree with six leaf nodes is merely illustrative. In general, network 22 may represent any tree-like structure with three or more total layers, 3-10 layers of TL nodes 24, 10-20 layers of TL nodes 24, more than 20 layers of TL nodes 24, 6-10 leaf nodes, 10-20 leaf nodes, 20-100 leaf nodes, hundreds of leaf nodes, or thousands of leaf nodes.

Figure 3:
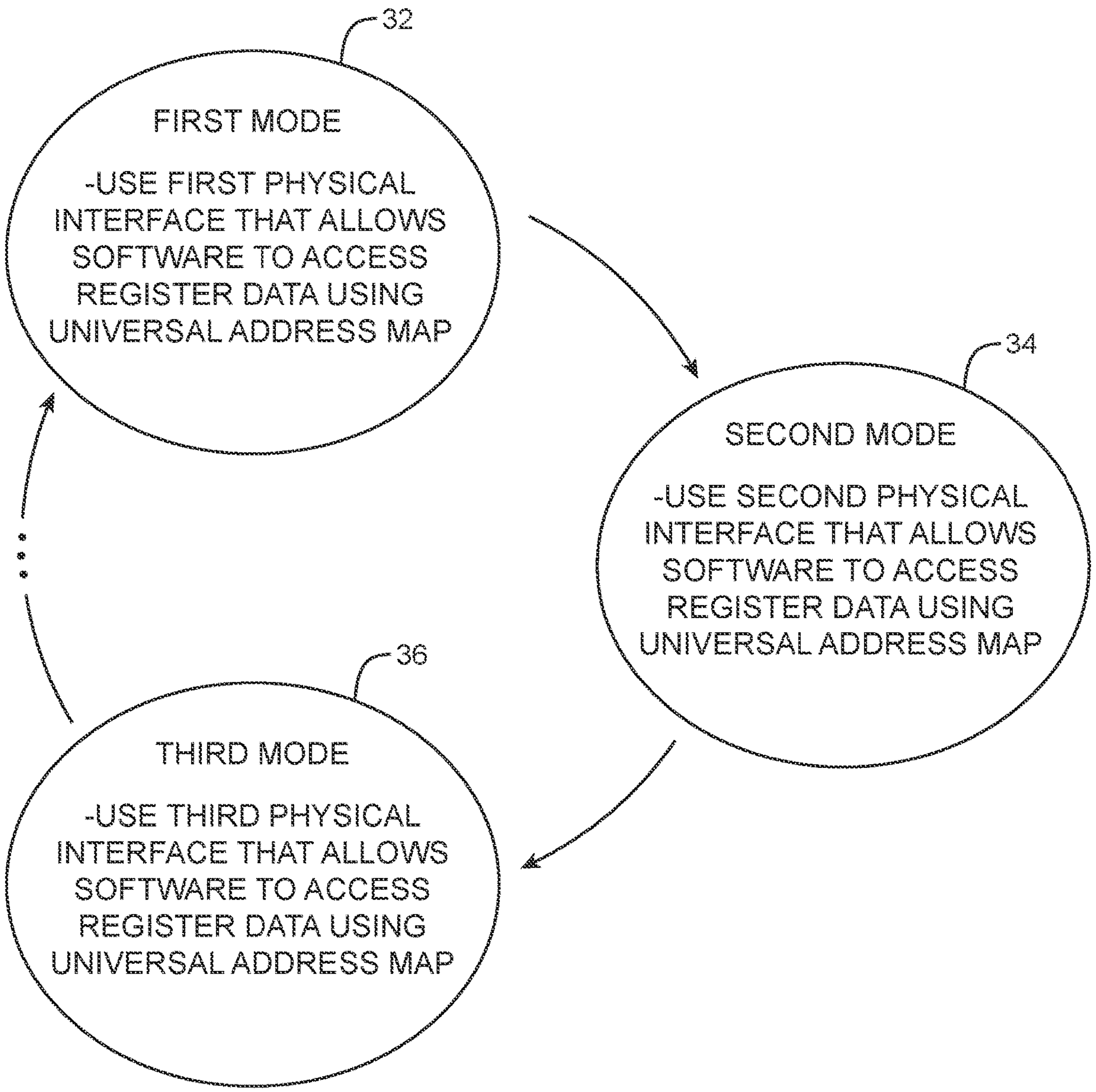
FIG. 3 is a diagram showing how a packet processor of the type shown in FIG. 2 can be operable in multiple states each supporting a different physical interface in accordance with some embodiments.

Configured in this way, each interface 28 can separately access the data storage components 20 within the tree-like network 22 using a universal address map. When data storage components 20 are registers, the universal address map used by multi-interface bridge 26 to access the network (or tree) of registers 20 can be referred to as a register map. FIG. 3 is a diagram showing how packet processor 16 of the type shown in FIG. 2 can be operable in multiple states each supporting a different physical interface. In a first mode 32, multi-interface bridge 26 can be coupled to a first CPU via physical interface 28-1, and software on the first CPU can access the data storage components 20 on the packet processor using a given (universal) address map. In a second mode 34, multi-interface bridge 26 can be coupled to a second CPU via a different physical interface 28-2, and software on the second CPU can access the data storage components 20 on the packet processor using the same (common) address map. In a third mode 36, multi-interface bridge 26 can be coupled to a third CPU via a different physical interface 28-3, and software on the third CPU can access the data storage components 20 on the packet processing using, again, the same (common) address map.

The three modes of FIG. 3 are exemplary. In general, multi-interface bridge 26 can be configured to support any number of physical interfaces and thus any corresponding number of modes. The various modes can occur at different times (e.g., only one mode is active at any given point in time) or can occur in parallel (e.g., two or more modes can be simultaneously active so that two or more different physical interfaces 26 are concurrently accessing elements 20 using the common address map). Supporting multiple physical interfaces 28 in this way allows development of new hardware features on packet processor 16 without discontinuing support for older physical interfaces, so the newer hardware can be backwards compatible with prior versions of software. This can also be beneficial to decouple the software development cycle from the hardware development cycle.

As described above, packet processor 16 can include data storage elements (e.g., counters 20) for storing count values associated with one or more input-output ports of processor 16. Packet processor 16 can simultaneously communicate with multiple endpoint devices via a plurality of ingress and egress ports. The ingress and egress ports are therefore sometimes referred to collectively as client (endpoint) ports or client (endpoint) input-output (I/O) ports. As examples, packet processor 16 can include at least two input-output ports for communicating with up to two endpoint or client devices, more than two input-output ports for communicating with more than two endpoint or client devices, two to ten input-output ports for communicating with up to ten endpoint or client devices, 10-20 input-output ports for communicating with up to 20 endpoint or client devices, 20-50 endpoint input-output ports for communicating with up to 50 endpoint or client devices, or more than 50 endpoint input-output ports for communicating with more than 50 endpoint or client devices.

Figure 4:
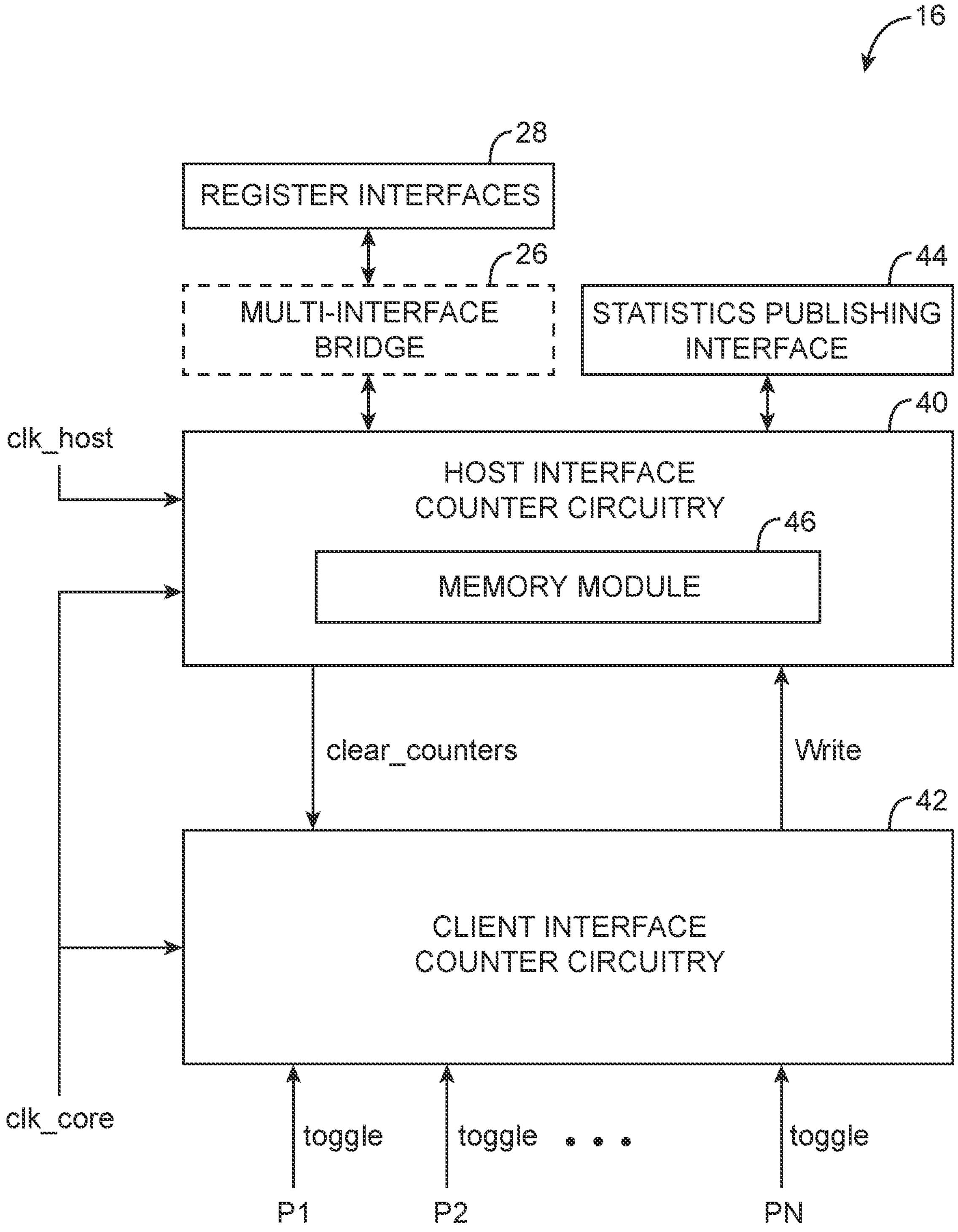
FIG. 4 is a diagram of an illustrative packet processor that includes count aggregation and publishing circuitry in accordance with some embodiments.

Packet processor 16 may include counters for keeping track of count values associated with each input-output port and aggregation circuitry for summing up the various count values. Packet processor 16 may also include statistics publishing circuitry for efficiently publishing the aggregated count values. FIG. 4 is a diagram showing how packet processor 16 can include count aggregation and publishing circuitry in accordance with some embodiments. As shown in FIG. 4, packet processor 16 may include host interface counter circuitry 40 and client interface counter circuitry 42.

Host interface counter circuitry 40 can be used to interface with a host device or controller such as main processor (CPU) 12 and can receive a first clock signal such as host clock signal clk_host and a second clock signal such as client/core clock signal clk_core. Host interface counter circuitry 40 can include memory such as memory module 46 for receiving count values or statistical data aggregated at client interface counter circuitry 42. Host interface counter circuitry 40 can be coupled to one or more register interfaces 28 such as physical interfaces 28-1, 28-2, and 28-3 of the type described in connection with FIG. 2 that can be used to access the various data storage elements or counters on packet processor 16. A multi-interface bridge 26 can optionally be coupled between host interface counter circuitry 40 and the one or more register interfaces 28 to enable circuitry 40 to communicate with different types of processor-to-processor physical interfaces.

Host interface counter circuitry 40 can also be coupled to a host CPU 12 via statistics publishing interface 44. Host interface counter circuitry 40 can collect all relevant counter values associated with any particular input-output port into a data structure and then transmit or publish the collected counter values and statistical information in the form of one or more data packet(s). For example, host interface counter circuitry 40 can transmit UDP (User Datagram Protocol) packets containing TLV (Type, Length, Value) data structures containing all counter values for each input-output port. A TLV record can include a TLV number, a base port number, a port counter indicating the total number of supported ports, and the number of counters per record. The TLV number can be a 16-bit number (as an example). In other embodiments, the TLV number can have fewer than 16 bits or can have more than 16 bits. Each counter in the record can be a 32-bit counter (as an example). In other embodiments, individual counter values can be fewer than 32 bits or can be greater than 32 bits.

Client interface counter circuitry 42 can receive client/core clock signal clk_core and can be used to monitor counter values associated with each of the N input-output ports (see, e.g., ports $P_1$, $P_2$, . . . , and $P_N$ coupled to client interface counter circuitry 42). Client interface counter circuitry 42 can include a plurality of counters or other counting circuits for monitoring count values per direction for each of the N ports. For example, counter circuitry 42 can increment, on a per port basis, a transmit (TX) count in response to transmission related toggling events, including but not limited to transmitting one or more unicast packets, one or more multicast packets, one or more broadcast packets, a transmit discard packets count, a transmit byte count, transmit error signal information, or transmit frame pausing information. Similarly, counter circuitry 42 can increment, on a per port basis, a receive (RX) count in response to reception related toggling events, including but not limited to receiving one or more unicast packets, one or more multicast packets, one or more broadcast packets, a receive discard packets count, a receive byte count, receive error signal information, or receive frame pausing information. The various count values accumulated in client interface counter circuitry 42 can optionally be cleared by one or more clear counter signals clear_counters received from host interface counter circuitry 40.

The various count values accumulated in client interface counter circuitry 42 can be written to memory module 46 on host interface counter circuitry 40. In some embodiments, accumulated count values stored within client interface counter circuitry 42 can be duplicated or mirrored onto memory module 46, and the duplicated count values can then be published (e.g., in the form of one or more UDP packets) to a corresponding host processor and/or sent to a central server or database. The aggregated counter or state information can be sent to a remote server (e.g., a UDP server) via one or more Ethernet interface, one or more Interlaken interface, or other types of network interface. Aggregating and publishing the counter values and other internal state information for the input-output ports as fully formed network packets in this way alleviates the need for software running on the CPU to have to actively poll or read all the counter/register values while allowing the collection of such counter data to be offloaded to some other server or cloud service, thus helping to remove compute overhead from the local network device.

Figure 5:
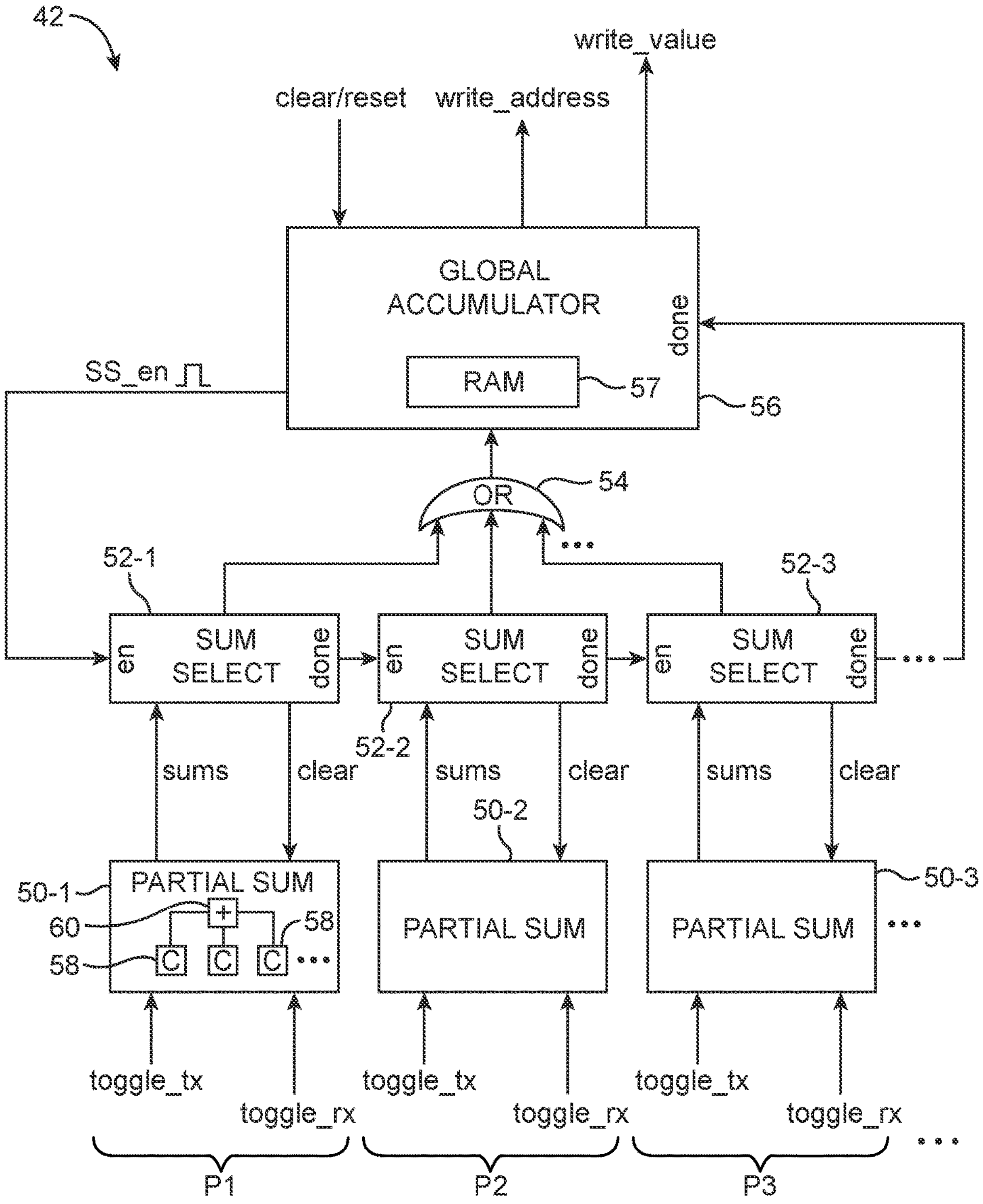
FIG. 5 is a diagram of illustrative client interface counter circuitry in accordance with some embodiments.

Client interface counter circuitry 42 may include hardware configured to monitor the counter values associated with each input-output port. FIG. 5 is a diagram showing an illustrative embodiment of client interface counter circuitry 42. As shown in FIG. 5, client interface counter circuitry 42 can include a plurality of partial summing circuits such as partial sum circuits 50, a plurality of sum selection circuits such as sum select circuits 52, and a global accumulation circuit such as global accumulator circuit 56.

The partial sum circuits may include at least a first partial sum circuit 50-1 configured to keep track of transmit and/or receive toggle events associated with a first input-output port $P_1$, a second partial sum circuit 50-2 configured to keep track of transmit and/or receive toggle events associated with a second input-output port $P_2$, and a third partial sum circuit 50-3 configured to keep track of transmit and/or receive toggle events associated with a third input-output port $P_3$. In general, client interface counter circuitry 42 can include any number of partial sum circuits 50 configured to monitor TX and/or RX toggle events associated with any number of input-output ports at the packet processor. Each partial sum circuit 50 can include a group (set) of counters 58 each keeping track of a partial sum. Counters 58 can sometimes be referred to as partial sum counters. Counters 58 can each be a relatively small counter circuit such as a 5-bit counter, a 6-bit counter, a 4-6 bit counter, or a 3-7 bit counter. The group of counters 58 can be coupled to a shared adder logic 60 to help minimize the total amount of resources required to implement the interface counters 58. Each partial sum circuit 50 can include a total of forty to sixty counters 58, thirty to seventy counters 58, at least 20 counters 58, at least 30 counters 58, more than fifty counters 58, more than sixty counters 58, sixty to a hundred counters 58, or more than a hundred counters 58.

The partial sums from the various partial sum counters 58 can, as an example, be output as an array of SLVs (standard logic vectors) containing all the partial sums to a corresponding sum select circuit 52. In the example of FIG. 5, first partial sum circuit 50-1 can provide an array of first partial sum values to a corresponding first sum select circuit 52-1, second partial sum circuit 50-2 can provide an array of second partial sum values to a corresponding second sum select circuit 52-2, third partial sum circuit 50-3 can provide an array of third partial sum values to a corresponding third sum select circuit 52-3, and so on. Each partial sum circuit 50 can also receive, as an input, a partial sum clear signal from the associated sum select circuit 52. The sum clear signal received at each partial sum circuit 50 can also be in the form of a standard logic vector where each bit corresponds to a counter 58 within the partial sum circuit. The counter value is cleared from the corresponding counter 58 in the cycle after the clear bit is asserted. If the partial sum clear signal is asserted at the same time that counter 58 is to be incremented, the new increment value can be loaded into counter 58 in the following cycle rather than counter 58 being cleared to zero on the following cycle.

The sum select circuit 52 can be configured to select a partial sum value to be output for accumulation to global accumulator circuit 56. The sum select circuits 52 can be connected together in a chain. As shown in the example of FIG. 5, first sum select circuit 52-1 can have an enable input configured to receive a synchronous enable pulse SS_en from global accumulator circuit 56; second sum select circuit 52-2 can have an enable input coupled to a done output of the preceding sum select circuit 52-1; third sum select circuit 52-3 can have an enable input coupled to a done output of the preceding sum select circuit 52-2; . . . ; and an $N^{th}$ sum select circuit 52-N (i.e., the last sum select circuit in the chain) can have an enable input coupled to a done output of the penultimate sum select circuit and can have a done output couple to a done input of global accumulator circuit 56.

Connected in this way, the enable pulse SS_en from global accumulator 56 can trigger a chain reaction that enables the output and clearing of each partial sum in a sequential fashion. The first partial sum can be selected for output and cleared two cycles after the enable pulse arrives at a given sum select circuit. This allows the sum select circuit at least one pipeline stage to generate the corresponding clear signal for the partial sum circuit and also one cycle for the sum select circuit to perform the input multiplexing across the array of partial sums. The next partial sum can be output and cleared in a subsequent clock cycle. The done signal can be pulsed two cycles before the last partial sum is output and cleared from the sum select circuit, which allows the done signal of one sum select circuit to be fed into the enable input of the next sum select circuit to trigger a similar operation in the next sum select circuit in the chain. When a sum select circuit is not enabled, the output bus is zeroed so that the outputs of all sum select circuits can be combined using a logic OR operation (see logic OR component 54) without needing a multiplexer with an explicit select signal. Alternatively, a multiplexing circuit can be used in place of logic OR module 54 to select from among the outputs of the N sum select circuits 52.

Global accumulator circuit 56 can be configured to receive and accumulate (aggregate) the partial sum values output from the various sum select circuits 52. As described above, global accumulator circuit 56 can generate an initial enable signal (pulse) to trigger a chain reaction through the multiple sum select circuits 52, where the output of all of the sum select circuits can be OR'ed together to provide a single partial sum for the currently selected (currently enabled) partial sum. The combined OR'ed partial sum value can be accumulated by global accumulator 56 and stored in a memory circuit such as block RAM (BRAM) 57 in global accumulator 56. Global accumulator 56 can synchronize the read and write addresses to RAM 57 in such a way that an output of the sum select circuits and a value read from RAM 57 arrive at appropriate times to accumulate a counter value and then write the accumulated value back into the same location from which it was read (e.g., a value is read from the block RAM, added to the currently received partial sum value, and the corresponding sum is then written back into the block RAM).

Counter values accumulated in RAM 57 are allowed to roll over. To enable roll over, RAM 57 can be accessed using a read point and a separate write pointer. The read access can be performed ahead of the write access (as an example). The use of both read and write ports of RAM 57 can help maximize the rate at which the counters within circuitry 42 are updated. As an example, RAM 57 can be configured to implement 512 counters or entries (e.g., effectively representing 512 32-bit counters). The 512 counters can be refreshed or accumulated once every 512 clock cycles, which can help minimize the size of the counters 58 within each partial sum circuit, which are relatively smaller counters. This example is merely illustrative. In other embodiments, RAM 57 may implement 128 multi-bit counters that are refreshed once every 128 cycles, 256 multi-bit counters that are refreshed once every 256 cycles, 1024 multi-bit counters that are refreshed once every 1024 cycles, fewer than 512 counters/entries, more than 512 counters/entries, or any desired number of multi-bit counters or registers. Global accumulator 56 may include one or more BRAMs 57 each having the same or different number of counters.

Global accumulator circuit 56 can output a write value and a corresponding write address to host interface counter circuitry 40 in order to mirror (copy) the contents of RAM 57 into memory 46 within circuitry 40 (see FIG. 4). Global accumulator circuit 56 can receive a reset and a clear counters signal from the host interface counter circuitry 40. The reset and clear signals can initiate an accumulation phase during which the values written back into RAM 57 is zeroed for all counters. The reset signal can abort all current actions and begin the accumulation phase that clears the RAM contents. The clear signal can queue the clearing operation to begin in the next accumulation operation.

Figure 6:
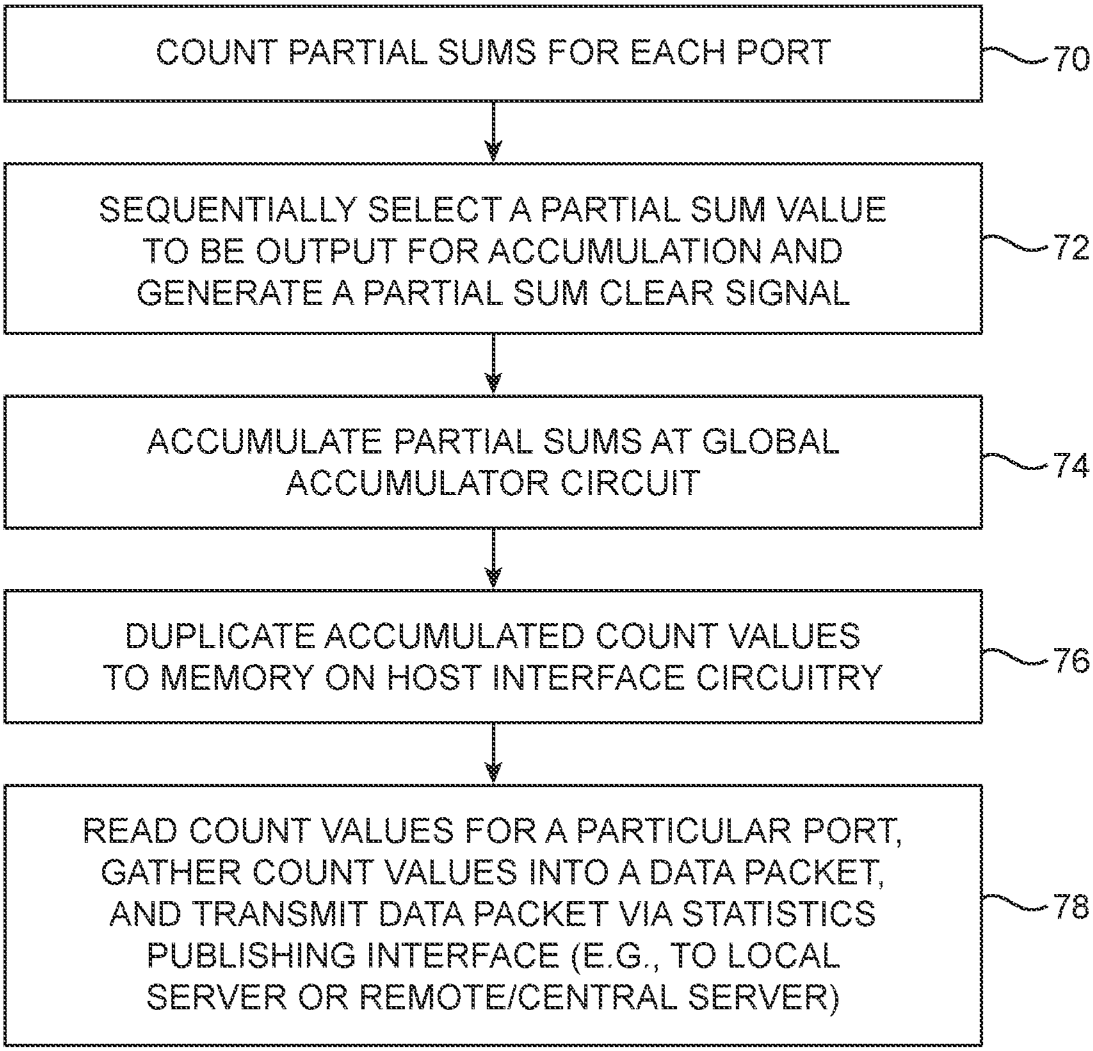
FIG. 6 is a flow chart of illustrative steps for operating the client interface counter circuitry of FIG. 5 in accordance with some embodiments.

FIG. 6 is a flow chart of illustrative steps for operating the host and client interface counter circuitries of the type described in connection with FIGS. 4 and 5. During the operations of block 70, the partial sum circuits are used to keep track of the partial sums for each input-output port. Each partial sum circuit can include a first set of relatively small counters 58 (e.g., five to six-bit counters) for monitoring TX toggling events and a second set of relatively small counters 58 for separately monitoring RX toggling events. The TX and RX counters 58 can optionally share one or more adder logic 60. The partial sum circuits can output partial sum values to corresponding sum select circuits.

During the operations of block 72, the sum select circuits can sequentially select a partial sum value to be output for aggregation at the global accumulation circuit and can generate a partial sum clear signal back to the partial sum circuits. The sum select circuits can be connected in a chain. The first sum select circuit in the chain can receive an enable pulse from the global accumulate circuit. A partial sum can be selected for output and cleared two cycles after the enable pulse arrives at a given sum select circuit. A next partial sum can be output and cleared in a subsequent clock cycle. The done signal can be pulsed two cycles before the last partial sum is output and cleared from the sum select circuit. When a sum select circuit is not enabled, the output bus is zeroed so that the outputs of all sum select circuits can be combined using a logic OR operation.

During the operations of block 74, the partial sum values output from the sum select circuits can be accumulated at the global accumulation circuit. Although block 74 is shown as occurring after blocks 70 and 72, the operations of block 74 can sometimes occur in parallel or simultaneously with the operations of block 70 and 72. The global accumulator circuit can include an internal memory module such as block RAM 57 for implementing a relatively large counter. As examples, block RAM 57 can include at least 128 entries, 256 entries, 512 entries, 1024 entries, or more than 500 entries. The global accumulator circuit can synchronize the read and write addresses to block RAM 57 in such a way that an output of the sum select circuits and a value read from RAM 57 arrive at appropriate times to accumulate a counter value and then write the accumulated value back into the same location from which it was read.

During the operations of block 76, the accumulated count values stored within RAM 57 can be duplicated or mirrored to memory 46 within the host interface counter circuitry 40. This can allow the count values to be read out asynchronously from the host interface counter circuitry 40 at a different clock rate using host clock signal clk_host that is separate from the internal clock clk_core controlling client interface counter circuitry 42.

During the operations of block 78, the host interface counter circuitry 40 can read (e.g., from mirrored memory 46) counter, status, or other accumulated statistical information for any particular input-output port, package the count values into a data packet (e.g., a UDP data packet or other type of datagram), and transmit the data packet via the statistics publishing interface 44 (see FIG. 4). The published data packet can be conveyed to a local server and stored on a local database or can be conveyed to a remote/central server and stored on a remote/central database. Operating the host and client interface counter circuitries in this way alleviates the need for software on a local/remote CPU or server to have to poll or read the counter values on a regular basis and thus obviates the need to develop and maintain a host driver that is dependent on the data aggregation hardware within the packet processor. Collecting and efficiently offloading data to some remote server can also help remove computing overhead from the local network device 10.

Figure 7:
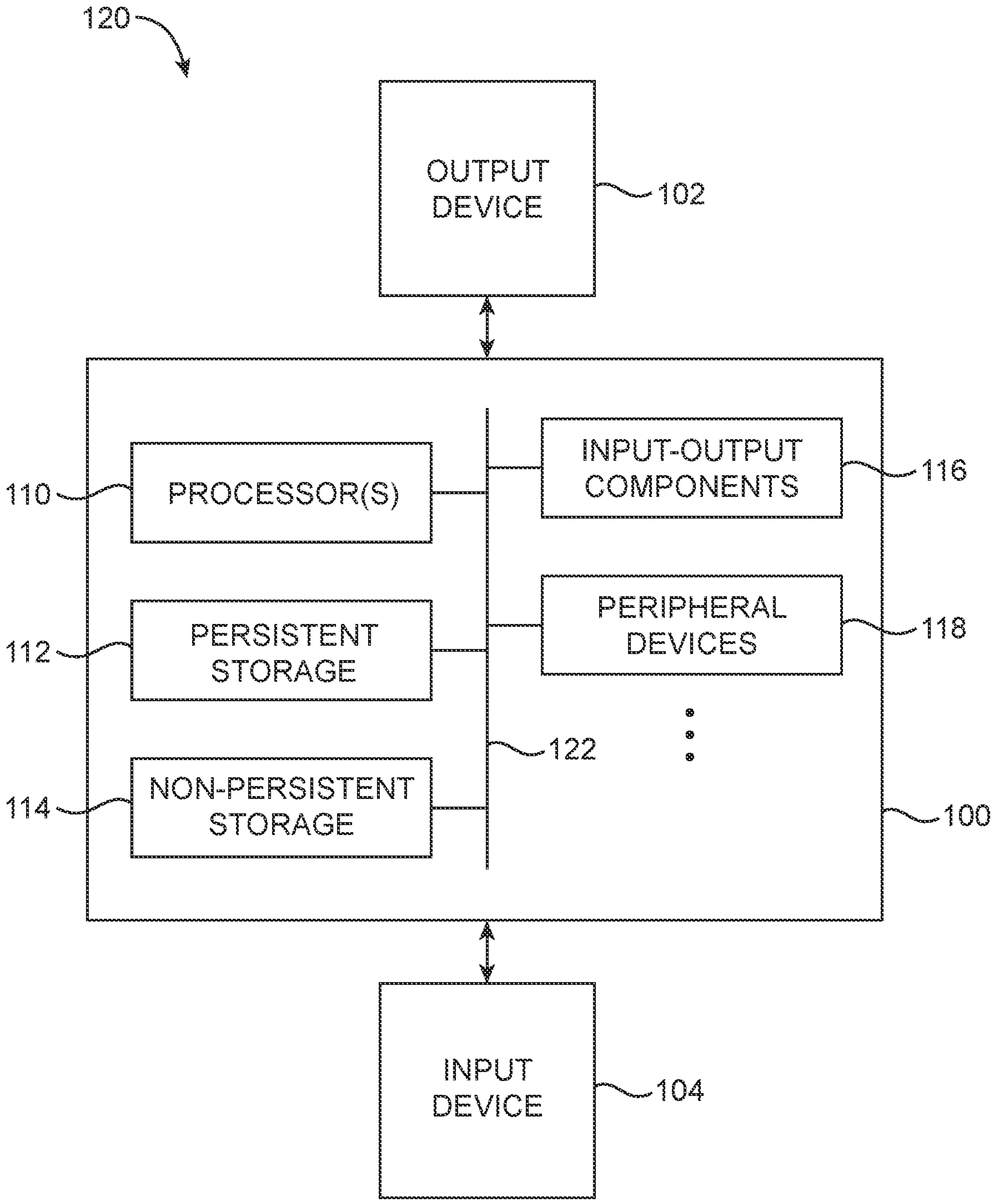
FIG. 7 is a diagram showing illustrative hardware components within a data processing system in accordance with some embodiments.

The foregoing embodiments may be made part of a larger system. FIG. 7 shows a system such as data processing system 120. Data processing system 120 may include a network device 100 optionally coupled to an input device 104 and/or an output device 102. Network device 100 may represent a network device 10 described in connection with the embodiments of FIGS. 1-6. Network device 100 may include one or more processors 110 (e.g., CPU 12 of FIG. 1), storage circuitry such as persistent storage 112 (e.g., flash memory or other electrically-programmable read-only memory configured to form a solid-state drive, a hard disk drive, etc.), non-persistent storage 114 (e.g., volatile memory such as static or dynamic random-access memory, cache memory, etc.), or any suitable type of computer-readable media for storing data, software, program code, or instructions, input-output components 116 (e.g., communication interface components such as a Bluetooth® interface, a Wi-Fi® interface, an Ethernet interface, an optical interface, and/or other networking interfaces for connecting device 100 to the Internet, a local area network, a wide area network, a mobile network, other types of networks, and/or to another network device), peripheral devices 118, and/or other electronic components. These components can be coupled together via a system bus 122.

As an example, network device 100 can be part of a host device that is coupled to one or more output devices 102 and/or to one or more input device 104. Input device(s) 104 may include one or more touchscreens, keyboards, mice, microphones, touchpads, electronic pens, joysticks, buttons, sensors, or any other type of input devices. Output device(s) 106 may include one or more displays, printers, speakers, status indicators, external storage, or any other type of output devices.

System 120 may be part of a digital system or a hybrid system that includes both digital and analog subsystems. System 120 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The methods and operations described above in connection with FIGS. 1-7 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 12 of FIG. 1, processor 110 of FIG. 7, etc.).

The foregoing is merely illustrative and various modifications can be made to the described embodiments. The foregoing embodiments may be implemented individually or in any combination.

What is claimed is:

1. An integrated circuit comprising:

a first physical interface operable to communicate with a first external processor using a first communications protocol;

a second physical interface operable to communicate with a second external processor using a second communications protocol different than the first communications protocol;

a plurality of data storage elements;

a multi-interface bridge interposed between the plurality of data storage elements and the first and second physical interfaces, wherein the multi-interface bridge enables the first external processor to access the plurality of data storage elements using an address map via the first physical interface and enables the second external processor to access the plurality of data storage elements using the address map via the second physical interface;

an input configured to receive a data packet from an ingress port; and an output via which the data packet is routed to an egress port in accordance with a forwarding information base, different than the address map, stored on the integrated circuit.

2. The integrated circuit of claim 1, further comprising:

a third physical interface operable to communicate with a third external processor using a third communications protocol different than the first and second communications protocol, wherein the multi-interface bridge further enables the third external processor to access the plurality of data storage elements using the address map via the third physical interface.

3. The integrated circuit of claim 1, wherein the first and second physical interfaces comprise interfaces selected from the group consisting of: an $I^2C$ (Inter-Integrated Circuit) interface, a PCIe (Peripheral Component Interconnect Express) interface, an Ethernet interface, and a SPI (Serial Peripheral Interface).

4. The integrated circuit of claim 1, wherein the plurality of data storage elements comprise registers.

5. The integrated circuit of claim 1, wherein the plurality of data storage elements comprise counters.

6. The integrated circuit of claim 1, wherein the plurality of data storage elements are interconnected via a tree-like network.

7. The integrated circuit of claim 6, wherein the plurality of data storage elements are interconnected via a plurality of transport layer nodes in the tree-like network.

8. The integrated circuit of claim 7, wherein at least some of the plurality of transport layer nodes are connected in a daisy chain.

9. The integrated circuit of claim 1, further comprising:

a plurality of input-output ports;

host interface counter circuitry coupled to the multi-interface bridge; and client interface counter circuitry coupled to the host interface counter circuitry and configured to accumulate count values for at least some input-output ports in the plurality of input-output ports and to write the accumulated count values into a memory circuit of the host interface counter circuitry.

10. The integrated circuit of claim 9, wherein the accumulated count values written into the memory circuit of the host interface counter circuitry are published by the host interface counter circuitry to a local or remote server via a statistics publishing interface.

11. The integrated circuit of claim 10, wherein the host interface counter circuitry is configured to publish the accumulated count values stored in the memory circuit as a User Datagram Protocol (UDP) data packet without software on the external processor polling the accumulated count values from the host interface counter circuitry.

12. The integrated circuit of claim 9, wherein the client interface counter circuitry comprises:

a plurality of partial sum circuits each of which is coupled to a respective one of the plurality of input-output ports and is configured to output partial sum values.

13. The integrated circuit of claim 12, wherein at least one partial sum circuit in the plurality of partial sum circuits comprises a plurality of counters coupled to a shared adder logic.

14. The integrated circuit of claim 12, wherein the client interface counter circuitry further comprises:

a plurality of sum select circuits configured to select one or more of the partial sum values output from the plurality of partial sum circuits, wherein the plurality of sum select circuits are coupled in a chain.

15. The integrated circuit of claim 14, wherein at least one sum select circuit in the plurality of sum select circuits comprises an enable input configured to receive an enable signal and a done output for presenting a done signal to a succeeding sum select circuit in the chain.

16. The integrated circuit of claim 14, wherein the plurality of sum select circuits are configured to output partial sum values that are combined via a logic OR operation.

17. The integrated circuit of claim 14, wherein the client interface counter circuitry further comprises:

a global accumulator circuit configured to accumulate one or more partial sum values output from the plurality of sum select signals and to store corresponding accumulated values into a block random-access memory within the global accumulator circuit.

18. The integrated circuit of claim 17, wherein the accumulated values stored in the block random-access memory are duplicated onto the memory circuit of the host interface counter circuitry.

19. The integrated circuit of claim 9, wherein the host interface counter circuitry is configured to receive a first clock signal and wherein the client interface counter circuitry is configured to receive a second clock signal different than the first clock signal.

20. A method of operating an integrated circuit, comprising:

with a first physical interface, communicating with a first external processor in accordance with a first communications protocol;

with a second physical interface, communicating with a second external processing in accordance with a second communications protocol different than the first communications protocol;

with data storage elements, storing data;

with a multi-interface bridge interposed between the data storage elements and the first and second physical interfaces, enabling the first external processor to access the data storage elements using an address map via the first physical interface and enabling the second external processor to access the data storage elements using the address map via the second physical interface;

with an input, receiving a data packet from an ingress port; and with an output, outputting the data packet to a corresponding egress port in accordance with a routing table stored on the integrated circuit.

* * * * *